US012637015B2

(12) United States Patent
Cho et al.

(10) Patent No.: US 12,637,015 B2
(45) Date of Patent: May 26, 2026

(54) STRAP MOUNT ASSEMBLY

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Shosho Cho, Aichi-ken (JP); Mutsuto Morioka, Shizuoka-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 339 days.

(21) Appl. No.: 18/385,441

(22) Filed: Oct. 31, 2023

(65) Prior Publication Data

US 2024/0149797 A1 May 9, 2024

(30) Foreign Application Priority Data

Nov. 7, 2022 (JP) ................................. 2022-177910

(51) Int. Cl.
B60R 11/00 (2006.01)

(52) U.S. Cl.
CPC ....... B60R 11/00 (2013.01); B60R 2011/0036 (2013.01)

(58) Field of Classification Search
CPC ... B60R 11/00; B60R 2011/0036; B60R 5/04; B60R 22/18; B62D 25/24; B62D 25/10; B62D 25/105; B62D 25/12; E05F 11/04; E05Y 2900/53

USPC ................................. 296/37.16, 191; 16/406
See application file for complete search history.

(56) References Cited

U.S. PATENT DOCUMENTS

| | | | | | |
|---|---|---|---|---|---|
| 2,665,143 | A | * | 1/1954 | Rasmussen | B60R 22/18 |
| | | | | | 160/DIG. 15 |
| 4,183,386 | A | * | 1/1980 | Brown | F16B 37/04 |
| | | | | | 411/176 |
| 4,292,932 | A | * | 10/1981 | Wooderson | A01K 1/04 |
| | | | | | 280/801.1 |

(Continued)

FOREIGN PATENT DOCUMENTS

| | | | | | |
|---|---|---|---|---|---|
| DE | 20004543 | U1 | * | 7/2000 | B60R 5/04 |
| FR | 2981319 | A3 | * | 4/2013 | B60R 22/26 |

(Continued)

*Primary Examiner* — Patricia L Engle
(74) *Attorney, Agent, or Firm* — Greenblum & Bernstein, P.L.C.

(57) ABSTRACT

A strap mount assembly includes a board member, a strap holding portion, and a stopper member. The board member has a first surface and a second surface that is an opposite surface of the first surface and includes a first insertion hole that is through the board member in a thickness direction and through which a first end portion of a strap is inserted to the second surface. The strap holding portion is on the first surface and configured to hold a second end portion of the strap and includes a second insertion hole in which the second end portion is inserted and that opens in a direction along the first surface. The stopper member is coupled to the second end portion and stops at a hole edge of the second insertion hole from an opposite side from the first insertion hole with respect to the second insertion hole.

11 Claims, 9 Drawing Sheets

(56)     References Cited

U.S. PATENT DOCUMENTS

| | | | | |
|---|---|---|---|---|
| 4,315,640 | A | * | 2/1982 | Nakazato ................. B60R 22/04 |
| | | | | 280/808 |
| 5,197,839 | A | * | 3/1993 | Willey ................... F16B 37/062 |
| | | | | 411/103 |
| 5,213,062 | A | * | 5/1993 | Canady, Jr. .............. A61D 3/00 |
| | | | | 5/628 |
| 6,406,085 | B1 | * | 6/2002 | Stanesic .................. B60R 5/045 |
| | | | | 296/97.23 |
| 7,726,926 | B2 | * | 6/2010 | Lemire ................... F16B 13/08 |
| | | | | 411/340 |
| 2025/0282305 | A1 | * | 9/2025 | Cook ...................... B60R 13/01 |

FOREIGN PATENT DOCUMENTS

| | | | | | |
|---|---|---|---|---|---|
| JP | 2019129591 | A | * | 8/2019 | |
| JP | 6883249 | | | 6/2021 | |
| KR | 19980036510 | U | * | 9/1998 | ............. B60R 11/00 |
| WO | WO-2013125487 | A1 | * | 8/2013 | ......... B60R 22/1955 |
| WO | WO-2023217563 | A1 | * | 11/2023 | ............... B60R 7/02 |
| WO | WO-2024180755 | A1 | * | 9/2024 | ............... B60R 7/02 |

* cited by examiner

STRAP MOUNT ASSEMBLY

CROSS REFERENCE TO RELATED APPLICATION

This application claims priority from Japanese Patent Application No. 2022-177910 filed on Nov. 7, 2022. The entire contents of the priority application are incorporated herein by reference.

TECHNICAL FIELD

The present technology described herein relates to a strap mount assembly.

BACKGROUND

A strap may be attached to a board member such as a deck board such that the board member can be easily moved from the position where the board member is placed. The strap is attached to the board member with one end of the strap being fixed to a rear surface of the board member. Specifically, with the one end of the strap being sandwiched between a support member having a plate shape and the rear surface of the board member, the strap is fixed to the support member with pins and the support member is fixed to a board body with screws.

SUMMARY

In the above configuration, the support member, the pins for fixing the strap to the support member, and the screws for fixing the support member to the board body are necessary to fix the strap. Therefore, with the above configuration, the number of components necessary for fixing the strap increases and it takes long time for fixing the strap.

An object of the present technology described herein is to provide a strap mount assembly with which a strap is attached easily and with a shorter time and a reduced number of components.

A strap mount assembly according to the technology described herein includes a board member, a strap holding portion, and a stopper member. The board member has a first surface and a second surface that is an opposite surface of the first surface and includes a first insertion hole that is through the board member in a thickness direction and through which a first end portion of a strap is inserted to the second surface. The strap holding portion is on the first surface of the board member and configured to hold a second end portion of the strap that is an opposite end portion from the first end portion. The strap holding portion includes a second insertion hole in which the second end portion is inserted and that opens in a direction along the first surface of the board member. The stopper member is coupled to the second end portion and stops at a hole edge of the second insertion hole from an opposite side from the first insertion hole with respect to the second insertion hole.

DETAILED DESCRIPTION

Figure 1:
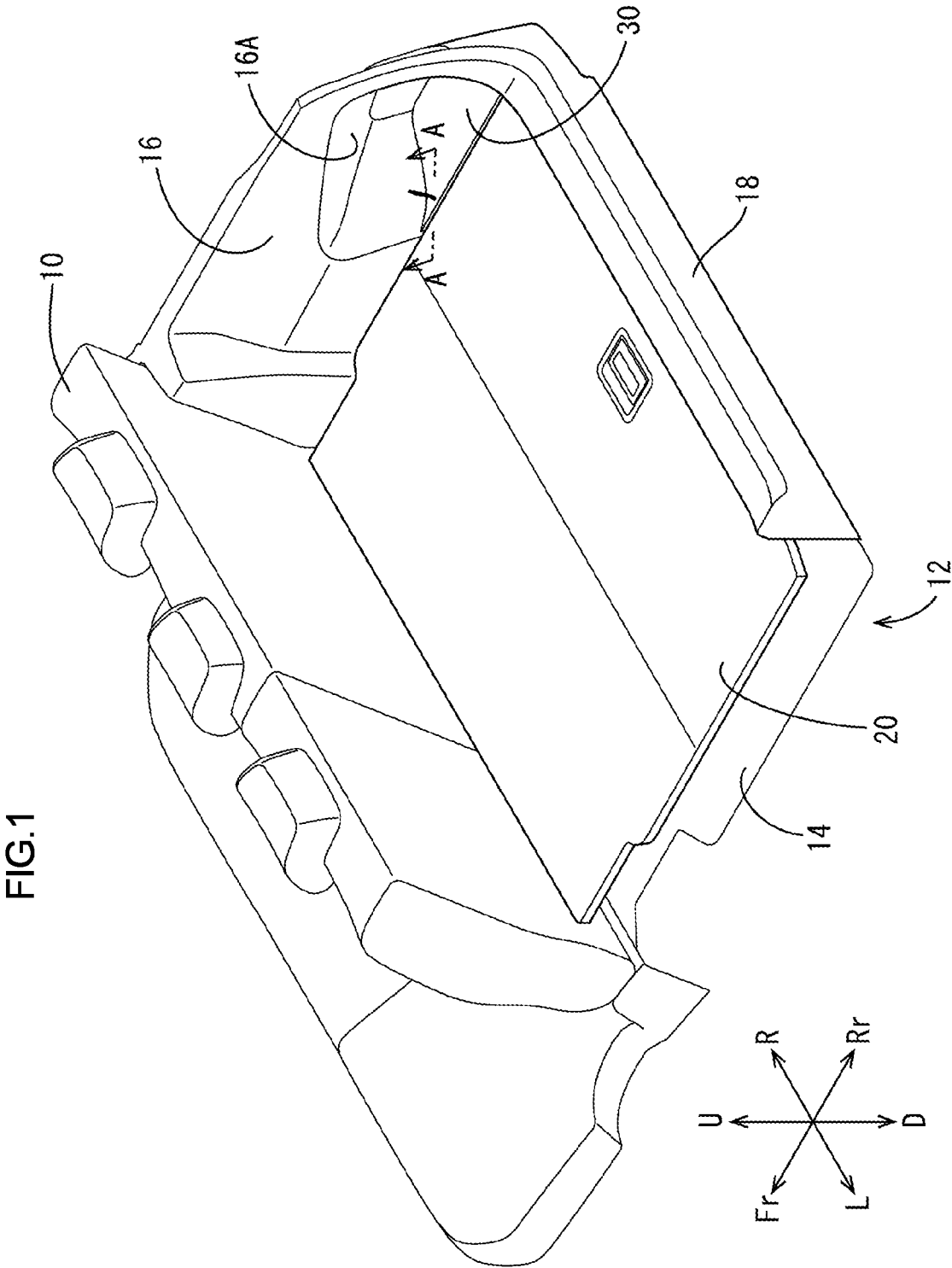
FIG. 1 is a perspective view illustrating a deck board and a deck side cover that includes a strap mount assembly according to one embodiment.
Figure 2:
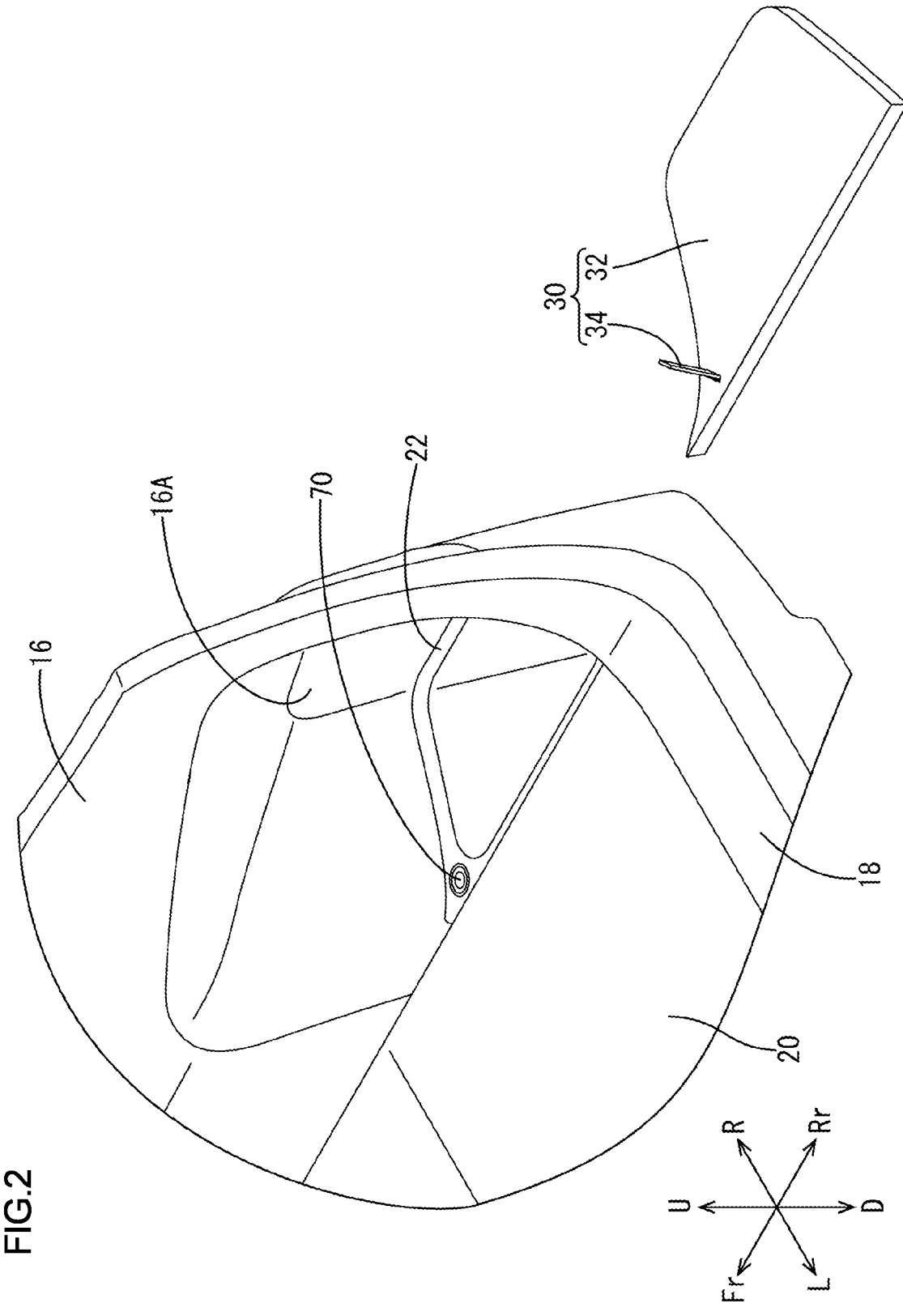
FIG. 2 is a perspective view of a portion of the deck board and a container box from which the deck side cover is removed.
Figure 3:
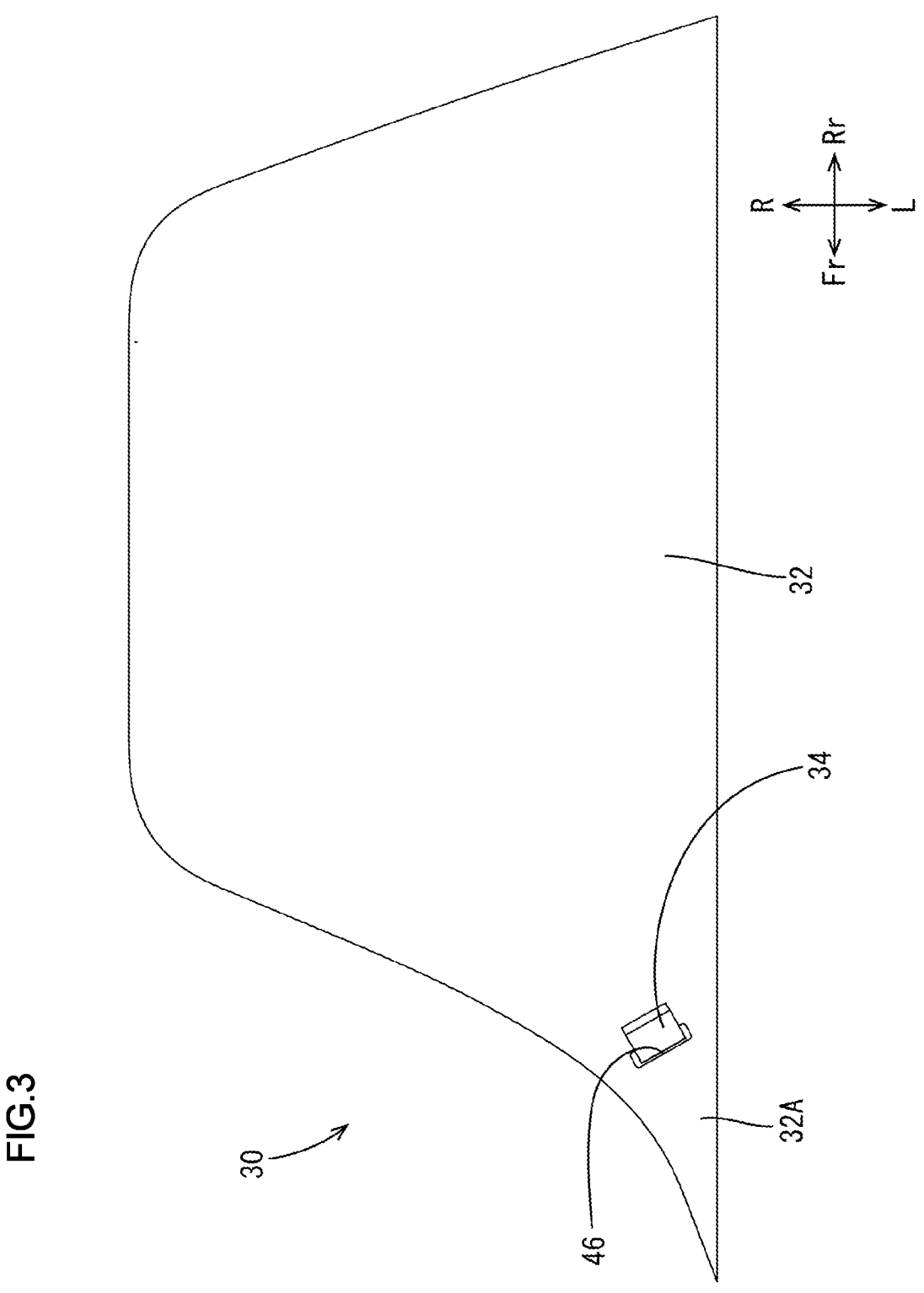
FIG. 3 is a plan view of the deck side cover.
Figure 4:
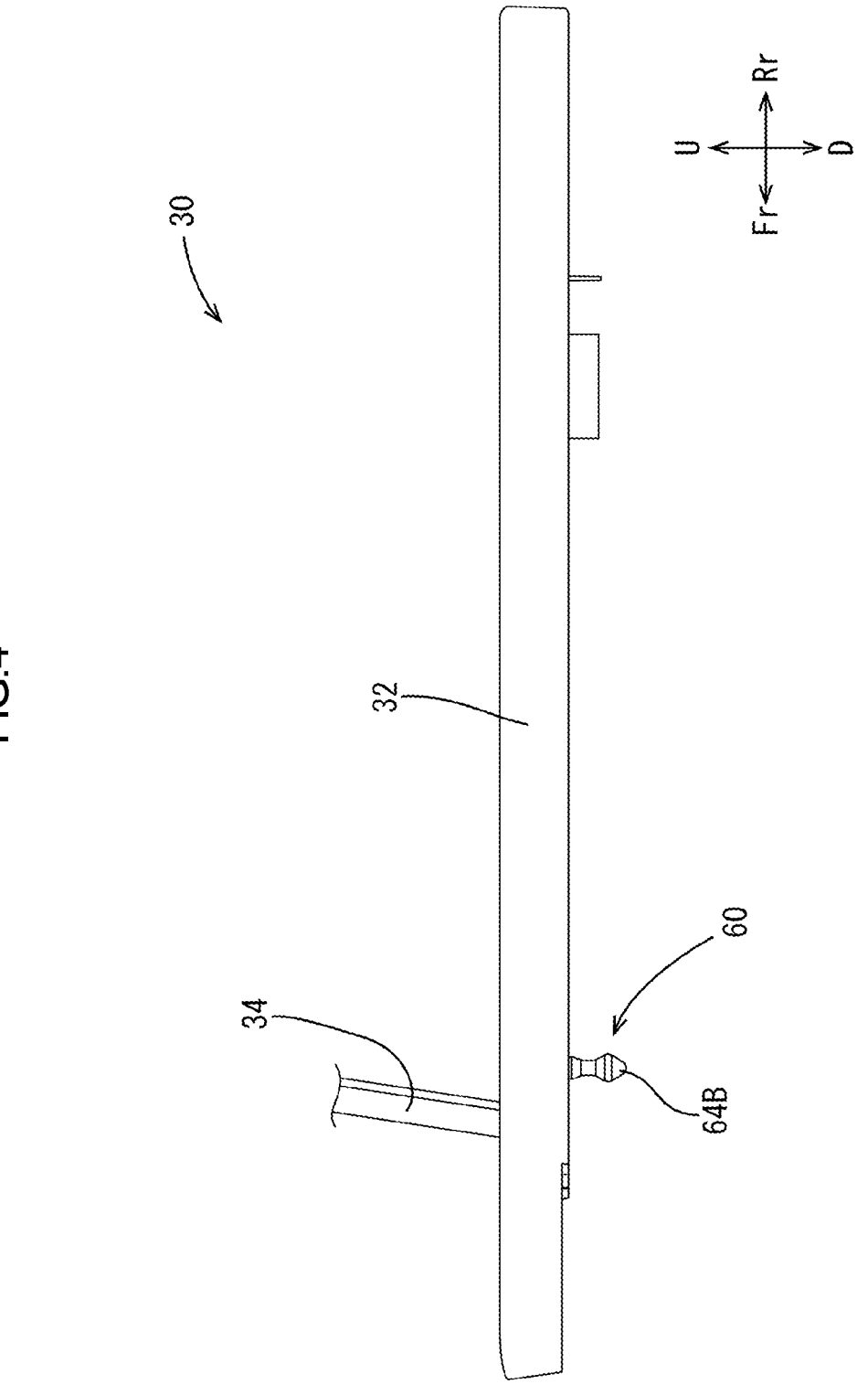
FIG. 4 is a side view of the deck side cover.

A strap mount assembly 1 according to this embodiment is included in a luggage room 12 that is behind a rear sheet 10 of a vehicle. As illustrated in FIG. 1, the luggage room 12 is defined by a storing box 14, a pair of deck side trims 16 on right and left sides, and a finish plate 18. A deck board 20 is disposed on the storing box 14 and configured as a floor surface of the luggage room 12. The deck side trim 16 includes a recessed portion 16A that is recessed toward a vehicular exterior side. As illustrated in FIG. 2, a container box 22 is fitted in the recessed portion 16A. A deck side cover 30 is detachably mounted on the container box 22 so as to be configured as a cover of the container box 22 and also as the floor surface of the luggage room 12.

The deck side cover 30 will be described in detail. In each drawing, the arrows Fr and Rr represent a vehicular front side and a vehicular rear side, respectively, and the arrows L and R represent a left side and a right side, respectively, with respect to a vehicular width direction, and the arrows of U and D represent an upper side and a lower side, respectively.

Figure 5:
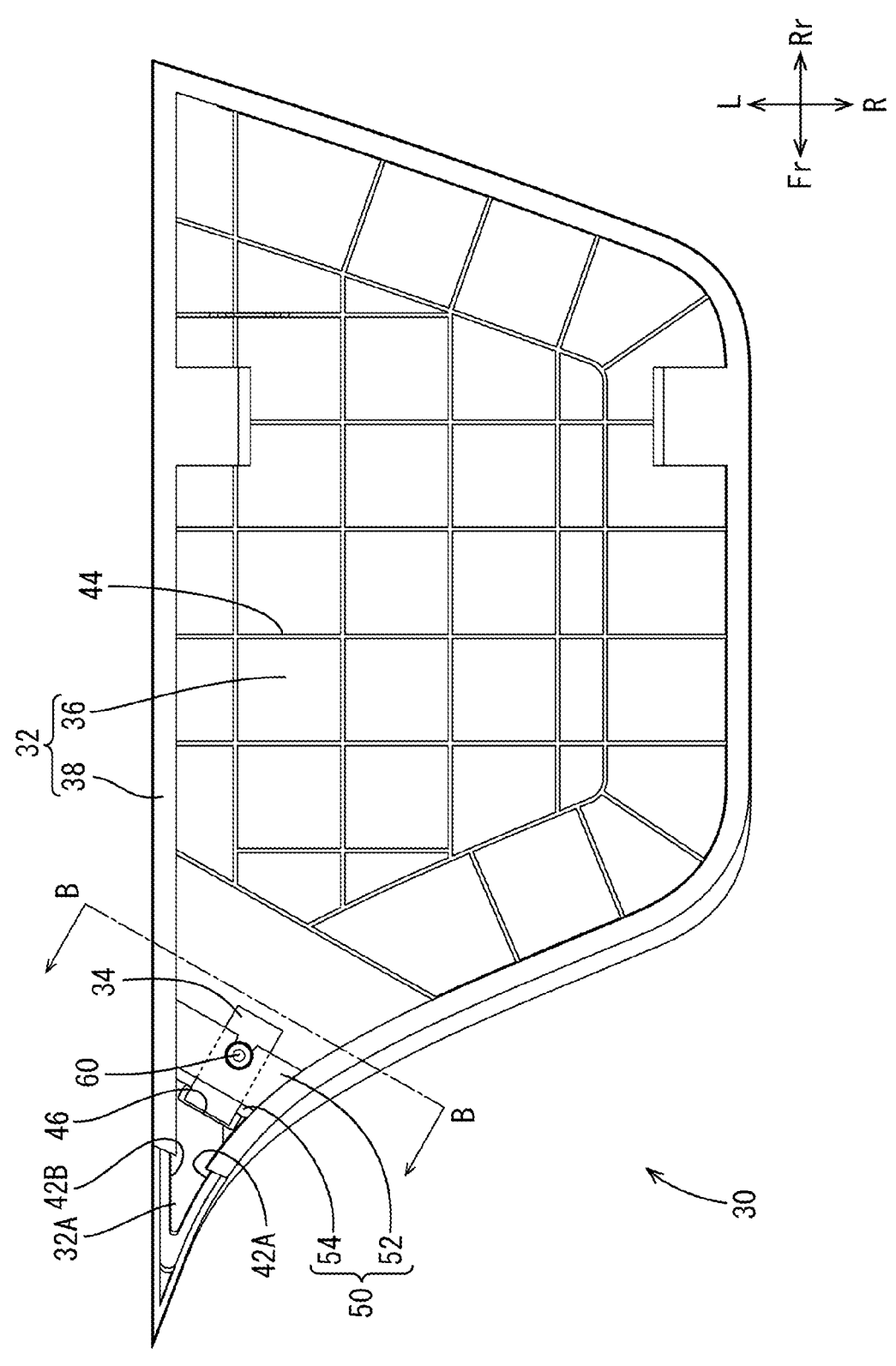
FIG. 5 is a rear side view of the deck side cover.
Figure 6:
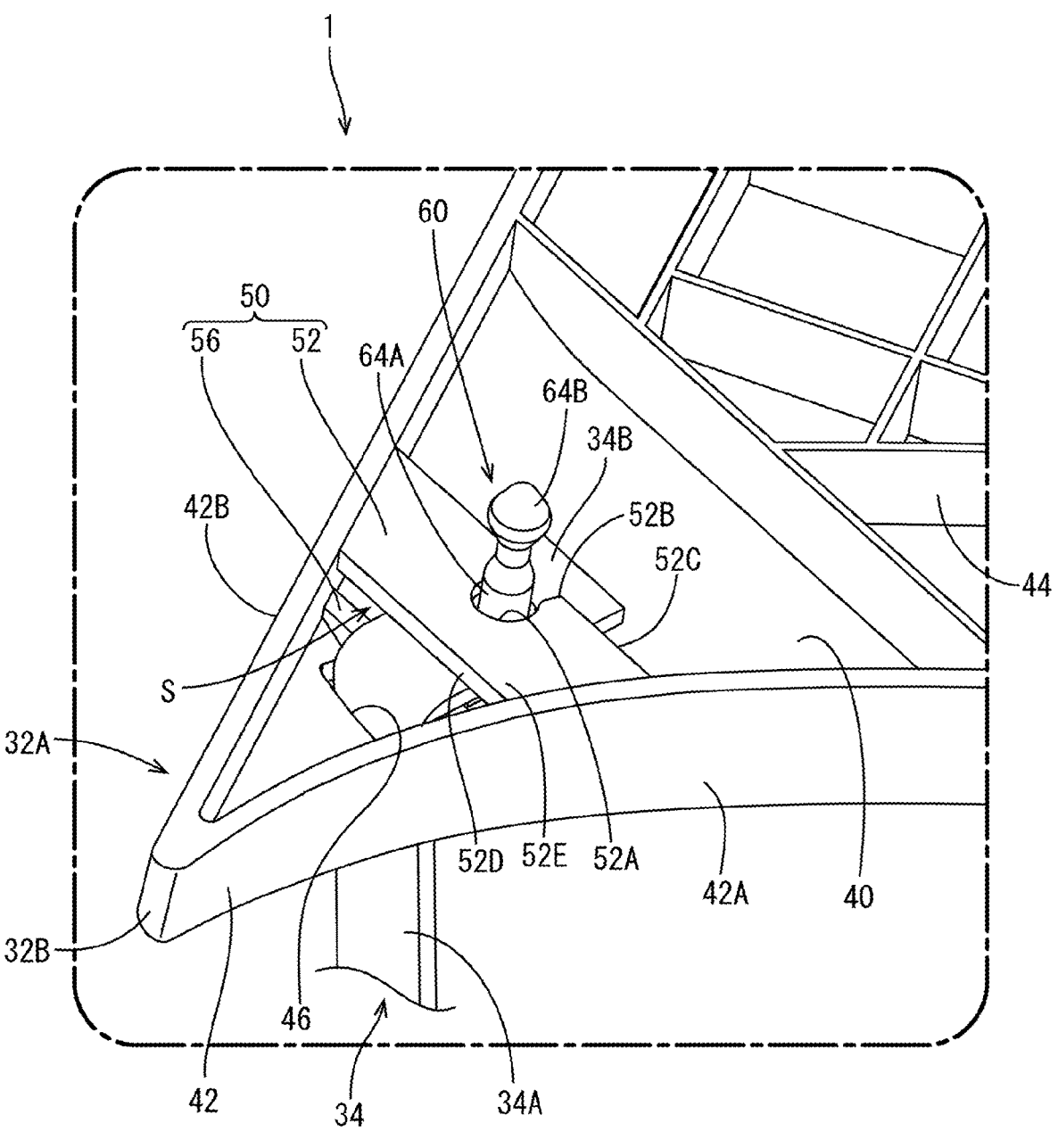
FIG. 6 is a perspective view of a portion of the deck side cover including the strap mount assembly.

As illustrated in FIGS. 2 to 5, the deck side cover 30 includes a cover body 32 having a plate shape and a strap 34 that is used when the deck side cover 30 is removed from the container box 22. The cover body 32 includes a base 36 that is made of synthetic resin and a skin 38 that covers a front surface 40F, which is a vehicular interior side surface, and side surfaces of the base 36. As illustrated in FIGS. 5 and 6, the base 36 of the cover body 32 includes a body portion 40, peripheral walls 42, and ribs 44. The body portion 40 is a plate member that is configured as the floor surface. The body portion 40 has the front surface 40F (a second surface) and a rear surface 40R (a first surface). The peripheral walls 42 extend from peripheral edges of the body portion 40 and extend from the rear surface 40R of the body portion 40. The ribs 44 extend from the rear surface 40R of the body portion 40. The ribs 44 are formed in a grid on a portion of the body portion 40 that is surrounded by the peripheral walls 42. This increases rigidity of the cover body 32. The cover body 32 has a shape so as to be fitted in a space between the deck board 20 and the deck side trim 16. The cover body 32 has a polygonal shape. The cover body 32 includes a tapered portion 32A (corner portion) that is tapered toward the vehicular front side. A first insertion hole 46 is in the tapered portion 32A. As illustrated in FIG. 6, the tapered portion 32A has a triangular shape. The cover body 32 has a polygonal shape and includes the tapered portion 32A that is a corner portion having the top 32B. The first insertion hole 46 is closer to the top 32B than a second insertion hole 47 is.

The strap 34 is a belt-shaped member and made of nylon. The strap 34 extends through the first insertion hole 46 toward the font surface 40F side (the vehicular interior side). An extending portion 34A of the strap 34 protrudes through the first insertion hole 46 toward the vehicular interior side. A user can lift a front portion of the deck side cover 30, which includes the tapered portion 32A, by pulling upward the extending portion 34A and remove the deck side cover 30 from the container box 22.

Figure 7:
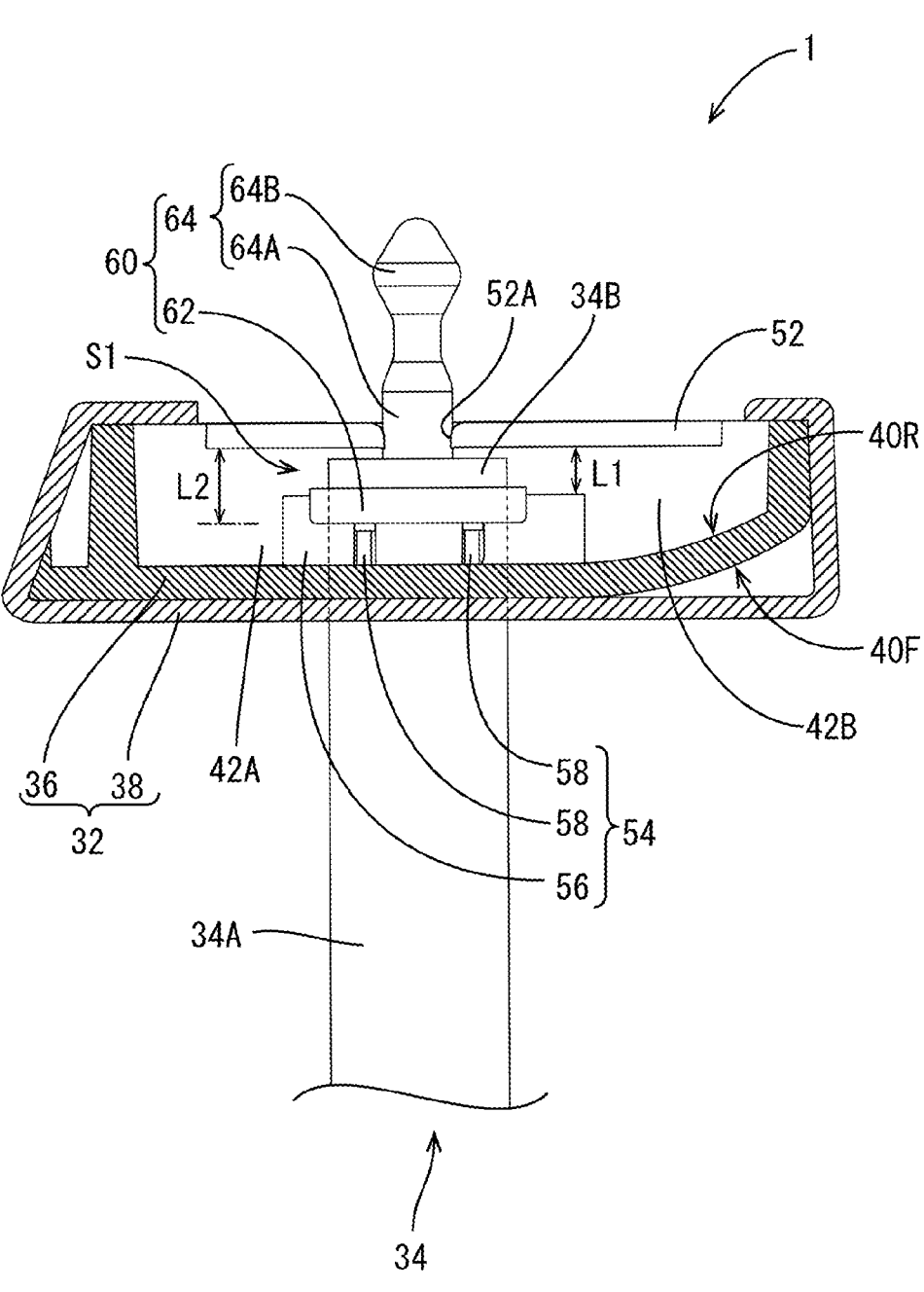
FIG. 7 is a cross-sectional view taken along B-B line in FIG. 5.
Figure 8:
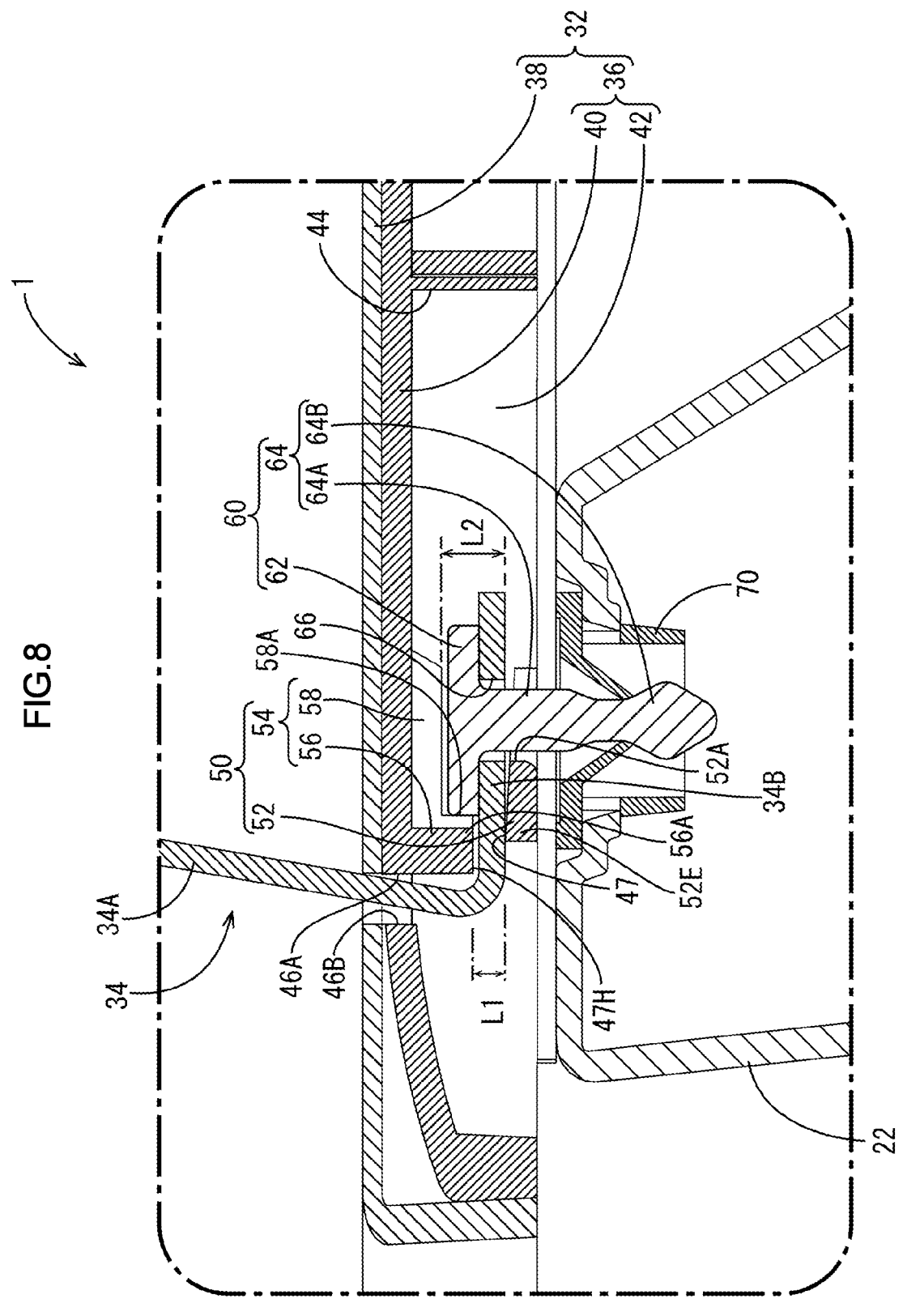
FIG. 8 is a cross-sectional view taken along A-A line in FIG. 1.

As illustrated in FIGS. 5 and 6, the tapered portion 32A of the body portion 40 does not include the ribs 44 on the rear surface 40R (the vehicular exterior side surface). The strap mount assembly 1 further includes a strap holding portion 50 on the rear surface 40R of the tapered portion 32A. The strap holding portion 50 holds a base portion 34B of the strap 34. As illustrated in FIGS. 5 and 6, the peripheral walls 42 include opposing walls 42A, 42B that extend from the peripheral edges of the tapered portion 32A. The opposing walls 42A, 42B are opposite each other. As illustrated in FIGS. 6 to 8, the strap holding portion 50 includes a connection portion 52 and a projection portion 54. The connection portion 52 extends between and connects the opposing walls 42A, 42B. The projection portion 54 projects from the rear surface 40R of the body portion 40 toward the connection portion 52. The first insertion hole 46 is an elongated hole that extends along an extending direction in which the connection portion 52 extends. The first insertion hole 46 extends through the body portion 40 in a thickness direction of the body portion 40.

The connection portion 52 is disposed on an opposite side from a top 32B of the tapered portion 32A with respect to the first insertion hole 46. The connection portion 52 is farther away from the top 32B than the first insertion hole 46 is. The connection portion 52 is disposed closer to a middle of the cover body 32 than the first insertion hole 46 is. The connection portion 52 extends parallel to the first insertion hole 46. The connection portion 52 is a plate member that extends from an extending end of the opposing wall 42A to an extending end of the opposing wall 42B. The connection portion 52 is a rectangular plate member. The connection portion 52 faces and is away from the rear surface 40R of the body portion 40. As illustrated in FIG. 6, the connection portion 52 has a first side 52C and a second side 52D that are parallel to each other and the second side 52D is closer to the first insertion hole 46 than the first side 52C is.

As illustrated in FIGS. 6 to 8, the projection portion 54 includes a projection wall 56 and a pair of protrusions 58 that project from the rear surface 40R (the vehicular exterior side surface) of the body portion 40. The projection wall 56 projects from the rear surface 40R of the body portion 40 toward the connection portion 52. The projection wall 56 extends between and connects the opposing walls 42A and 42B. The projection wall 56 connects opposing inner surfaces of the opposing walls 42A and 42B. The projection wall 56 is disposed next to the first insertion hole 46 and is closer to the middle of the cover body 32 than the first insertion hole 46 is.

As illustrated in FIG. 8, a portion of the projection wall 56 that is directly continuous from the body portion 40 and opposite an inner space of the first insertion hole 46 is configured as a hole edge of the first insertion hole 46. The first insertion hole 46 has a first hole edge 46A and a second hole edge 46B that extend along the connection portion 52. The first hole edge 46A is closer to the middle of the cover body 32 than the second hole edge 46B is. The portion of the projection wall 56 that is opposite the inner space of the first insertion hole 46 is configured as the first hole edge 46A. As illustrated in FIG. 8, the projection wall 56 and the connection portion 52 are disposed such that an inner portion 56A of the projection wall 56 that is on an opposite side from the first hole edge 46A overlaps an outer portion 52E of the connection portion 52 that is closer to the first insertion hole 46. The inner portion 56A of the projection wall 56 overlaps the outer portion 52E of the connection portion 52 with respect to the upper-bottom direction. As illustrated in FIGS. 7 and 8, the protrusions 58 are on an opposite side from the first insertion hole 46 with respect to the projection wall 56. The protrusions 58 extend from the projection wall 56 in a direction perpendicular to the extending direction in which the projection wall 56 extends or the first insertion hole 46 extends. The protrusions 58 extend along a plate surface of the body portion 40. A dimension of the protrusions 58 measured from the rear surface 40R of the body portion 40 is smaller than a dimension of the projection wall 56 measured from the rear surface 40R of the body portion 40.

As illustrated in FIGS. 6 and 8, a space S is between the connection portion 52 and the projection wall 56 of the projection portion 54. The space S is an inner space of the second insertion hole 47 that is defined by the connection portion 52, the projection wall 56, and the opposing walls 42A, 42B. A distance L1 of the second insertion hole 47 between the connection portion 52 and the projection wall 56 with respect to the upper-bottom direction is slightly greater than a thickness of the strap 34. The second insertion hole 47 is through in the direction that is along the plate surface of the body portion 40. The second insertion hole 47 opens in an opening direction that is perpendicular to the thickness direction of the body portion 40 and the extending direction in which the first insertion hole 46 extends. The first insertion hole 46 and the second insertion hole 47 extend parallel to each other. As illustrated in FIG. 8, the first insertion hole 46 and the second insertion hole 47 are disposed not to overlap with respect to the thickness direction. The second insertion hole 47 is between the connection portion 52 and the projection portion 54. The base portion 34B of the strap 34 is inserted through the second insertion hole 47. As illustrated in FIG. 8, with the strap 34 being mounted in the strap holding portion 50, the extending portion 34A is on the vehicular interior side of the body portion 40 and the base portion 34B is on the vehicular exterior side of the body portion 40 and the strap 34 is bent at a right angle between the extending portion 34A and the base portion 34B.

As illustrated in FIG. 6, the second insertion hole 47 is between the second side 52D of the connection portion 52 and the rear surface 40R of the body portion 40. The second side 52D of the connection portion 52 and the extending end of the projection portion 54 are configured as a hole edge 47H of the second insertion hole 47.

A pin 60 (a stopper member) is attached to the base portion 34B of the strap 34. With the pin 60 stopping at the hole edge 47H of the second insertion hole 47 from an opposite side from the first insertion hole 46 with respect to the projection wall 56, the base portion 34B of the strap 34 is held by the strap holding portion 50 with the pin 60.

As illustrated in FIGS. 6 to 9, the pin 60 includes a base 62 having a disk plate shape and a pin body 64 that projects from a center of the base 62. The pin body 64 is inserted through a mount hole 66 of the base portion 34B of the strap 34. With the pin 60 that is attached to the strap 34 being mounted in the strap holding portion 50, the strap holding portion 50 holds the base portion 34B of the strap 34. As illustrated in FIG. 7, the base 62 of the pin 60 and the base portion 34B are inserted in a space S1 that is between the connection portion 52 and the pair of protrusions 58 from an opposite side from the first insertion hole 46 with respect to the connection portion 52. The space S1 has a distance L2 that is between the connection portion 52 and the protrusions 58. The distance L2 is about a total of a thickness of the base 62 and a thickness of the strap 34. The extending portion 34A of the strap 34 is inserted through the second insertion hole 47 from the opposite side from the first insertion hole 46 before the base 62 and the base portion 34B are inserted in the space S1 between the connection portion 52 and the protrusions 58.

As illustrated in FIG. 8, the connection portion 52 is configured such that the thickness decreases and the distance between the upper surface (facing the body portion 40) of the connection portion 52 and the protrusions 58 increases as it extends away from the first insertion hole 46. According to such a configuration, the strap 34 and the base 62 of the pin 60 can be easily inserted in the space S1 between the protrusions 58 and the connection portion 52. Furthermore, the strap 34 can be held between the base 62 and the connection portion 52 such that no space is between the strap 34 and each of the base 62 and the connection portion 52 with respect to the upper-bottom direction.

Figure 9:
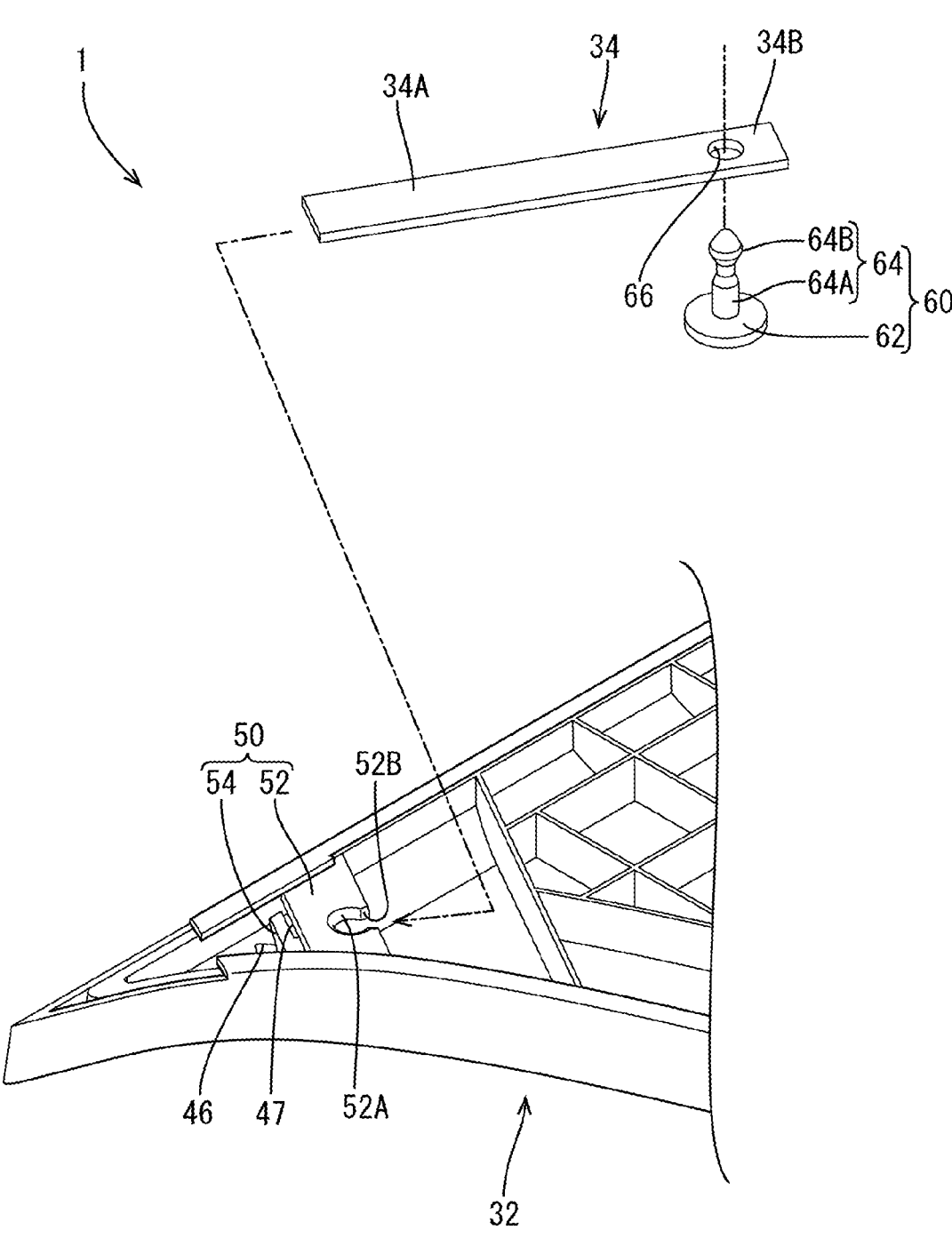
FIG. 9 is an exploded perspective view illustrating the strap mount assembly.

As illustrated in FIGS. 5, 6, and 9, the connection portion 52 includes a fitting hole 52A that is through a thickness of the connection portion 52 and has an opening 52B on the first side 52C. The fitting hole 52A opens toward an opposite side from the first insertion hole 46. The pin body 64 includes a shaft portion 64A that extends continuously from the base 62 and a top portion 64B. With the pin 60 being mounted in the strap holding portion 50, the shaft portion 64A of the pin body 64 is fitted in the fitting hole 52A of the connection portion 52. With the shaft portion 64A being fitted in the fitting hole 52A, the base 62 is in contact with stopper portions 58A of the protrusions 58. The stopper portions 58A extend along the projection wall 56 toward the second insertion hole 47 and are continuous from the projection wall 56. Extending ends of the stopper portions 58A are configured as a portion of a hole edge 47H of the second insertion hole 47. The projection wall 56 projects from the from the rear surface 40R of the body portion 40 toward the connection portion 52. A projecting end of the projection wall 56 is configured as a portion of the hole edge 47H of the second insertion hole 47. The opening 52B of the fitting hole 52A is slightly smaller than an outer diameter of the shaft portion 64A. With such a configuration, the shaft portion 64A that is fitted in the fitting hole 52A is not removed therefrom easily. With the shaft portion 64A of the pin body 64 being fitted in the fitting hole 52A, the strap holding portion 50 holds the pin 60 and the base portion 34B of the strap 34.

With the pin 60 that is coupled to the base portion 34B being mounted in the strap holding portion 50, the pin 60 is in contact with the stopper portions 58A of the projection portion 54. The pin 60 that is coupled to the base portion 34B is mounted on the connection portion 52. With the pin 60 that is coupled to the base portion 34B being mounted in the strap holding portion 50, the second insertion hole 47 is between the first insertion hole 46 and the pin 60 with respect to the opening direction of the second insertion hole 47.

According to this embodiment, the strap mount assembly 1 includes the cover body 32 (the board member), the strap holding portion 50, and the pin 60. The cover body 32 includes the first insertion hole 46 that is through the thickness direction of the cover body 32 and through which the extending portion 34A of the strap 34 is inserted to the front surface 40F. The strap holding portion 50 is on the rear surface 40R side and configured to hold the base portion 34B of the strap 34. The strap holding portion 50 includes the second insertion hole 47 in which the base portion 34B is inserted and that opens in a direction along the rear surface 40R. The pin 60 is coupled to the base portion 34B and stops at the hole edge 47H of the second insertion hole 47 from the opposite side from the first insertion hole 46 with respect to the second insertion hole 47.

As illustrated in FIG. 9, according to the strap mount assembly 1 of this embodiment, only by inserting the pin 60 in the mount hole 66 of the base portion 34B and inserting the extending portion 34A through the second insertion hole 47 and the first insertion hole 46 in this order, the pin 60 stops at the hole edge 47H of the second insertion hole 47 and the strap 34 is attached to the cover body 32 simply. With the strap mount assembly 1 of this embodiment, the strap 34 can be attached to the cover body 32 only with the pin 60. This reduces the number of components. With the strap mount assembly 1 of this embodiment, the screwing operation of fixing an additional member, which is sandwiched between the base portion 34B of the strap 34 and the cover body 32, with screws is not necessary. This simplifies the mounting operation and shortens time for the mounting operation.

The cover body 32 includes the body portion 40, which has a plate surface, and the peripheral walls 42. The peripheral walls 42 extend from the peripheral edges of the body portion 40 and extend from the rear surface 40R of the body portion 40. The body portion 40 includes the tapered portion 32A that is tapered in a plan view. The tapered portion 32A includes the first insertion hole 46. The peripheral walls 42 include the opposing walls 42A, 42B that extend from the peripheral edges of the tapered portion 32A and are opposite each other. In the strap mount assembly 1 according to this embodiment, the cover body 32 further includes the connection portion 52 that is a plate member. The connection portion 52 is a plate member that extends from the opposing wall 42A to the opposing wall 42B. The connection portion 52 faces and is away from the rear surface 40R of the body portion 40. The second insertion hole 47 is between the connection portion 52 and the rear surface 40R of the body portion 40. The pin 60 is fitted to the connection portion 52 from the opposite side from the first insertion hole 46 with respect to the connection portion 52. The connection portion 52 has the first side 52C and the second side 52D that are parallel to each other. The second side 52D is closer to the first insertion hole 46 than the first side 52C is.

With the cover body 32 including the tapered portion 32A, the rigidity of the tapered portion 32A is likely to decrease. In this respect, according to the strap mount assembly 1 of this embodiment, the connection portion 52, which defines the second insertion hole 47, extends from the opposing wall 42A to the opposing wall 42B that are opposite each other in the tapered portion 32A. With such a configuration, the rigidity of the tapered portion 32A is increased. Furthermore, the projection wall 56 of the projection portion 54 that is disposed opposite the connection portion 52 extends between and connects the opposing walls 42A, 42B. This further increases the rigidity of the tapered portion 32A.

In the strap mount assembly 1 according to this embodiment, the cover body 32 includes the projection portion 54 that projects from the rear surface 40R of the body portion 40 toward the connection portion 52. The projection portion 54 is opposite the connection portion 52. The second insertion hole 47 is between the connection portion 52 and the projection portion 54 (specifically, the projection wall 56). The pin 60 is in contact with the connection portion 52 and the projection portion 54 from the opposite side from the first insertion hole 46 with respect to the connection portion 52 and the projection portion 54. Thus, the pin 60 stops at the connection portion 52 and the projection portion 54. With such a configuration, when the extending portion 34A of the strap 34 is pulled upward to remove the deck side cover 30, the pin 60 is contacted with the projection portion 54, which is on the upper side with respect to the strap 34, and the connection portion 52, which is on the lower side with respect to the strap 34. Therefore, the force of pulling the strap 34 can be transferred stably to the cover body 32 via the projection portion 54 and the connection portion 52 and the deck side cover 30 can be removed easily.

As illustrated in FIGS. 4 and 6 to 8, the top portion 64B of the pin body 64 projects further from the extending ends of the peripheral walls 42. As illustrated in FIGS. 2 and 8, the top portion 64B of the pin body 64 is to be fitted in a packing 70 that is mounted in a mount hole of the container box 22. The container box 22 is covered with the deck side cover 30. The packing 70 is made of rubber or soft synthetic resin. The deck side cover 30 is fixed to the container box 22 with the pin 60 that fixes the strap 34 to the strap holding portion 50. When the deck side cover 30 is removed with the top portion 64B (a fitting portion) of the pin 60 being fitted in the packing 70 and the deck side cover 30 covering the container box 22, the pin 60 is connected to the strap 34 and the top portion 64B of the pin 60 that is fitted in the packing 70 is disposed directly below the strap 34. With such a configuration, the force of pulling the strap 34 is directly transferred to the pin 60 and the top portion 64B of the pin 60 can be removed from the packing 70 easily. Furthermore, the deck side cover 30 is less likely to be moved from the correct position due to vibration of a vehicle and strange noise is less likely to be caused.

OTHER EMBODIMENTS

The technology described herein is not limited to the embodiment described above with reference to the drawings. The technology described herein may be modified within the technical scope. The following embodiments may be included in the technical scope.

(1) The strap holding portion may have various forms and configurations other than those of the above embodiment. For example, the strap holding portion may include a projection portion that projects from the rear surface 40R of the body portion 40 and the projection portion may include the second insertion hole that is through the projection portion in the direction along the rear surface 40R. In such a configuration, the second insertion hole preferably opens in the opening direction that is perpendicular to the extending direction in which the first insertion hole 46 extends. The stopper member may be contacted with a surface of the projection portion that is opposite from a first insertion hole side surface.

(2) The strap 34 may not be necessarily attached to the tapered portion 32A of the cover body 32 but may be attached to any portion of the cover body 32 that has a rectangular shape.

(3) The pin 60 may not be fitted in the container box 22. The cover body 32 may be just arranged on the container box 22 to cover the container box 22. In such a configuration, the pin 60 may not project further from a lower end of the cover body 32.

(4) The strap mount assembly 1 may be included in the deck board 20 or other components installed in a vehicle.

(5) The present technology is not necessarily applied to an automobile but may be applied to various kinds of vehicles. Furthermore, the present technology may be applied to various kinds of objects such as furniture.

The invention claimed is:

1. A strap mount assembly comprising:
   a board member having a first surface and a second surface that is an opposite surface of the first surface and including a first insertion hole that is through the board member in a thickness direction and through which a first end portion of a strap is inserted to the second surface;
   a strap holding portion being on the first surface of the board member and configured to hold a second end portion of the strap that is an opposite end portion from the first end portion, the strap holding portion including a second insertion hole in which the second end portion is inserted and that opens in a direction along the first surface of the board member; and
   a stopper member coupled to the second end portion and stopping at a hole edge of the second insertion hole from an opposite side from the first insertion hole with respect to the second insertion hole,
   wherein
   the stopper member is a pin that includes a shaft portion extending in the thickness direction of the board member, and
   a distal end of the shaft portion is coupled to the second end portion and to be fitted to a base member that is covered with the board member.

2. A strap mount assembly comprising:
   a board member having a first surface and a second surface that is an opposite surface of the first surface and including a first insertion hole that is through the board member in a thickness direction and through which a first end portion of a strap is inserted to the second surface;
   a strap holding portion being on the first surface of the board member and configured to hold a second end portion of the strap that is an opposite end portion from the first end portion, the strap holding portion including a second insertion hole in which the second end portion is inserted and that opens in a direction along the first surface of the board member;
   a stopper member coupled to the second end portion and stopping at a hole edge of the second insertion hole from an opposite side from the first insertion hole with respect to the second insertion hole; and
   wherein
   the board member includes
      a body portion that is a plate member having the first surface, the second surface, and peripheral edges and includes a tapered portion including the first insertion hole,
      peripheral walls that extend from the peripheral edges of the body portion and extend from the first surface, the peripheral walls including opposing walls that extend from the peripheral edges of the tapered portion and are opposite each other, and
      a connection portion that extends from one of the opposing walls to another one of the opposing walls and is a plate member facing and being away from the first surface of the body portion, and the connection portion having a first side and a second side that are parallel to each other, the second side being closer to the first insertion hole than the first side is,
   the second insertion hole is between the connection portion and the first surface of the body portion, and
   the stopper member is fitted to the connection portion from the first side.

3. The strap mount assembly according to claim 2, wherein the strap holding portion includes a projection portion that projects from the first surface of the body portion toward the connection portion, the second insertion hole is between the connection portion and the projection portion, and the stopper member is in contact with the connection portion and the projection portion from the opposite side from the first insertion hole with respect to the connection portion and the projection portion.

4. A strap mount assembly comprising:

a board member having a first surface and a second surface that is an opposite surface of the first surface and including a first insertion hole that is through the board member in a thickness direction and through which a first end portion of a strap is inserted to the second surface;

a strap holding portion being on the first surface of the board member and configured to hold a second end portion of the strap that is an opposite end portion from the first end portion, the strap holding portion including a second insertion hole in which the second end portion is inserted and that opens in a direction along the first surface of the board member; and a stopper member coupled to the second end portion and stopping at a hole edge of the second insertion hole from an opposite side from the first insertion hole with respect to the second insertion hole, wherein the second insertion hole and the first insertion hole are disposed not to overlap with respect to the thickness direction.

5. The strap mount assembly according to claim 4, wherein the first insertion hole and the second insertion hole are elongated in an extending direction, and the first insertion hole opens in the thickness direction and the second insertion hole opens in an opening direction that is perpendicular to the thickness direction and the extending direction.

6. The strap mount assembly according to claim 5, wherein the second insertion hole is between the first insertion hole and the stopper member with respect to the opening direction of the second insertion hole.

7. The strap mount assembly according to claim 5, wherein the strap holding portion includes a connection portion, the connection portion is a plate member that faces and is away from the first surface of the board member and extends in the extending direction, the connection portion has a first side and a second side that are parallel to each other and the second side is closer to the first insertion hole than the first side is, the second insertion hole is between the second side of the connection portion and the first surface of the board member, and the stopper member that is coupled to the second end portion is mounted on the connection portion.

8. The strap mount assembly according to claim 7, wherein the strap holding portion includes a projection portion that projects from the first surface toward the connection portion, the second insertion hole is between the connection portion and the projection portion, and the stopper member that is coupled to the second end portion is in contact with the projection portion.

9. The strap mount assembly according to claim 8, wherein the connection portion and the projection portion extend in the extending direction.

10. The strap mount assembly according to claim 4, wherein the stopper member coupled to the second end portion is mounted in the strap holding portion.

11. The strap mount assembly according to claim 4, wherein the board member has a polygonal shape and includes a corner portion having a corner top, the corner portion includes the first insertion hole, and the first insertion hole is closer to the corner top than the second insertion hole is.

* * * * *